United States Patent [19]
Danforth

[11] Patent Number: 5,338,896
[45] Date of Patent: Aug. 16, 1994

[54] SHIELD DEVICE FOR CELLULAR PHONES

[76] Inventor: David M. Danforth, 82 Fairy Dell Rd., Clinton, Conn. 06413

[21] Appl. No.: 115,574

[22] Filed: Sep. 3, 1993

[51] Int. Cl.$^5$ .......................................... H05K 9/00
[52] U.S. Cl. ................................. 174/35 R; 455/346
[58] Field of Search ........ 343/702, 715, 792, 700 MS; 174/35 R, 35 MS, 35 TS, 35 GC; 455/33.1, 89, 90, 97, 128, 344, 346, 347, 348

[56] References Cited
U.S. PATENT DOCUMENTS

| | | | |
|---|---|---|---|
| 4,721,965 | 1/1988 | Elliot | 343/715 |
| 4,725,846 | 2/1988 | Hendershot | 343/792 |
| 4,740,794 | 4/1988 | Phillips et al. | 343/702 |
| 4,868,576 | 9/1989 | Johnson, Jr. | 343/702 |
| 5,041,838 | 8/1991 | Liimatainen et al. | 343/700 MS |
| 5,218,187 | 6/1993 | Koenck et al. | 235/375 |
| 5,262,792 | 11/1993 | Egashira | 343/702 |

*Primary Examiner*—Leo P. Picard
*Assistant Examiner*—Christopher Horgan
*Attorney, Agent, or Firm*—Hugh E. Smith

[57] ABSTRACT

A shield device for any phone with an antenna that emits and receives microwaves, in particular cellular phones. The shield device protects a user by blocking the passage of microwaves to and from the cellular phone antenna while the phone is in use. In the first embodiment of the invention, the shield device comprises a rectangular shaped body with an upper tab for attaching the shield device to the antenna and two opposing lower tabs for attaching the shield device to the upper portion of the cellular phone. The shield device consists of a cover with a pocket for receiving the shielding member. In a second embodiment of the invention, the shield device contemplates a semi-circular hollow tubular member adapted to fit over an antenna. The tubular member has an elastic bottom portion adapted to fit firmly over the antenna ferrule. The bottom portion of the tubular member consists of a resilient disk member, thus protecting the user from any microwaves emitted and received by the antenna. In a third embodiment of the invention, the shield device comprises a hollow tubular member with telescoping members of a collapsible, retractable form.

6 Claims, 4 Drawing Sheets

SHIELD DEVICE FOR CELLULAR PHONES

BACKGROUND OF THE INVENTION

1. Field of the Invention

The present invention relates to shield devices and more particularly pertains to a shield device for cellular phones which may be used to protect a user from microwaves emitted and received by an antenna.

2. Description of the Prior Art

The use of shield devices is known in the prior art. More specifically, shield devices heretofore devised and utilized for the purpose of protecting a user from electromagnetic waves emitted from portable phones are known to consist basically of familiar, expected and obvious structural configurations, notwithstanding the myriad of designs encompassed by the crowded prior art which have been developed for the fulfillment of countless objectives and requirements.

The present invention is directed to improving devices for protecting a user from microwaves emitted and received by a phone antenna in a manner which is safe, secure, economical and aesthetically pleasing.

It is common to install electromagnetic shielding devices for portable phones and other electronic equipment which is subject to electromagnetic interference from internally and externally generated electromagnetic signals.

Such a device is shown and described in U.S. Pat. No. 5,124,889 and is installed within the casing of the phone itself.

Another example of a shield device is described in U.S. Pat. No. 4,783,666 and is designed to protect antenna arrays from weather conditions.

Other relevant patents include U.S. Pat. Nos. DES. 305,334, DES. 309,302, and 5,079,562.

There is concern about the possibility of harmful effects to users of cellular phones from microwaves emitted and received by the antenna when the phone is in use. Drawbacks of the prior art shield device comprise lack of protection for a user from the microwave leakage. The present invention is unique in responding to the above concern.

In this respect, the shield device according to the present invention substantially departs from the conventional concepts and designs of the prior art, and in so doing provides an apparatus primarily developed for the purpose of protecting a user from microwaves emitted and received by the cellular phone antenna.

Therefore, it can be appreciated that there exists a continuing need for new and improved shield device which can protect a user from cellular phone antenna microwave leakage. In this regard, the present invention substantially fulfills this need.

SUMMARY OF THE INVENTION

In view of the foregoing disadvantages inherent in the known types of shield devices now present in the prior art, the present invention provides a unique shield device construction wherein the shield device can be utilized for protecting cellular phone users from microwaves emitted and received by the antenna when the phone is in use. As such, the general purpose of the present invention, which will be described subsequently in greater detail, is to provide a new and improved shielding apparatus and method which has all the advantages of the prior art shield devices and none of the disadvantages.

The invention is defined by the appended claims with the specific embodiment shown in the attached drawings. For the purpose of summarizing the invention, the invention may be incorporated into a unique shield device for any phone with an antenna that emits and receives microwaves, in particular cellular phones. The shield device comprises an outer cover with a pocket area to receive the shielding means. The shield device also comprises an upper tab and two lower opposing tabs designed to secure the shield device to the cellular phone.

An alternate embodiment of the invention comprises a semi-circular hollow tubular member adapted to fit over the cellular phone antenna. The base portion of the tubular member consists of a resilient disk member providing a frictional fit, thus protecting a user by blocking the passage of microwaves.

In a further embodiment of the invention, the shield device comprises a hollow tubular member adapted to fit over the cellular phone antenna and is formed of telescoping members that allow for extension and retraction of the shield device.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. In as much as the foregoing has outlined rather broadly the more pertinent and important features of the present invention in order that the detailed description of the invention that follows may be better understood so that the present contribution to the art can be more fully appreciated. Additional features of the invention will be described hereinafter which form the subject of the claims of the invention. It should be appreciated by those skilled in the art that the conception and the disclosed specific methods and structures may be readily utilized as a basis for modifying or designing other structures for carrying out the same purposes of the present invention. It should be realized by those skilled in the art that such equivalent methods and structures do not depart from the spirit and scope of the invention as set forth in the appended claims.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

Therefore, it is an object of the present invention to provide a new shield device for protecting a user from microwaves emitted and received by an antenna on a cellular phone when the phone is in use.

It is an additional object of the present invention to provide a new and improved shield device which has all the advantages of the prior art shield devices and none of the disadvantages.

It is another object of the present invention to provide a new and improved shield device which may be easily and efficiently manufactured and marketed.

It is a further object of the present invention to provide a new and improved shield device which is of a durable and reliable construction.

An even further object of the present invention is to provide a new and improved shield device which is susceptible of a low cost of manufacture with regard to both materials and labor, and which accordingly is then susceptible of low prices of sale to the consuming public, thereby making such shield devices economically available to the buying public.

Still yet another object of the present invention is to provide a new and improved shield device which provides in the apparatuses and methods of the prior art some of the advantages thereof, while simultaneously overcoming some of the disadvantages normally associated therewith.

Still another object of the present invention is to provide a new and improved shield device that is easy to install and requires no tools or alterations to the phone.

Yet another object of the present invention is to provide a new and improved shield device that keeps the antenna from direct contact with the a user's body, since the shield device is spaced one inch from the antenna, such that once the device is attached properly to the cellular phone, it deflects any microwaves from the head area when the phone is in use.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention. The foregoing has outlined some of the more pertinent objects of this invention. These objects should be construed to be merely illustrative of some of the more prominent features and applications of the present invention. Many other beneficial results can be attained by applying the disclosed invention in a different manner or by modifying the invention within the scope of the disclosure. Accordingly, other objects and a fuller understanding of the invention may be had by referring to the summary of the invention and the detailed description of the preferred embodiment in addition to the scope of the invention defined by the claims taken in conjunction with the accompanying drawings.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
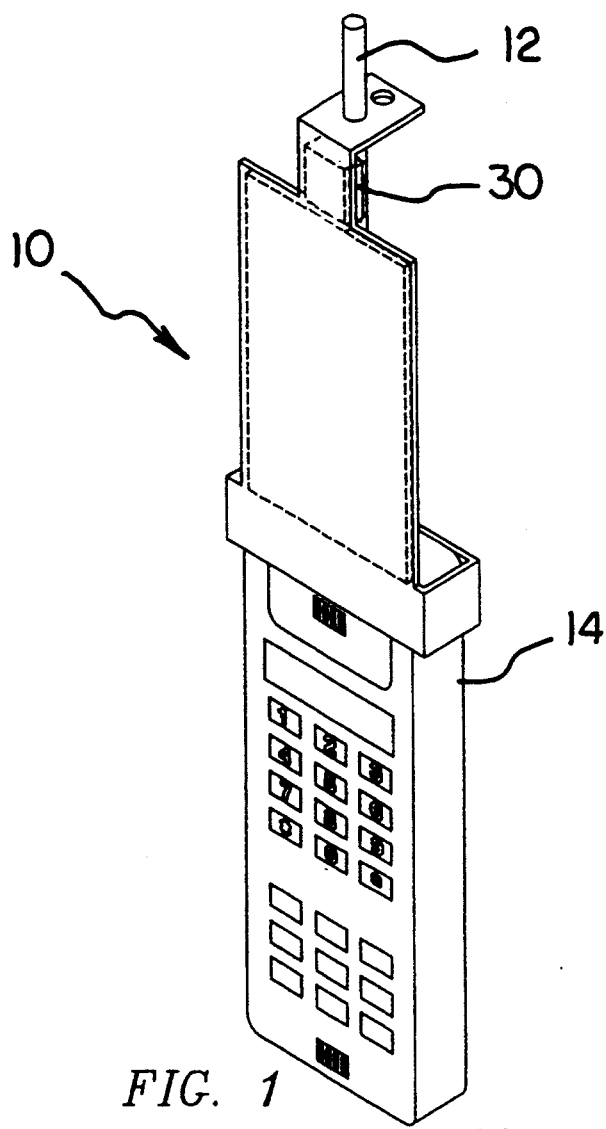
FIG. 1 is a perspective view of the shield device secured to a cellular phone.

With reference now to the drawings, and in particular to FIG. 1 thereof, a new and improved shield device for protecting a user from microwaves emitted and received by a cellular phone antenna embodying the principles and concepts of the present invention and generally designated by the reference numeral 10 will be described. From an overview standpoint, FIG. 1 shows the shield device 10 which is adapted for attaching to the antenna 12 and upper portion of the cellular phone 14, thus securing the shield device to the cellular phone.

Figure 2:
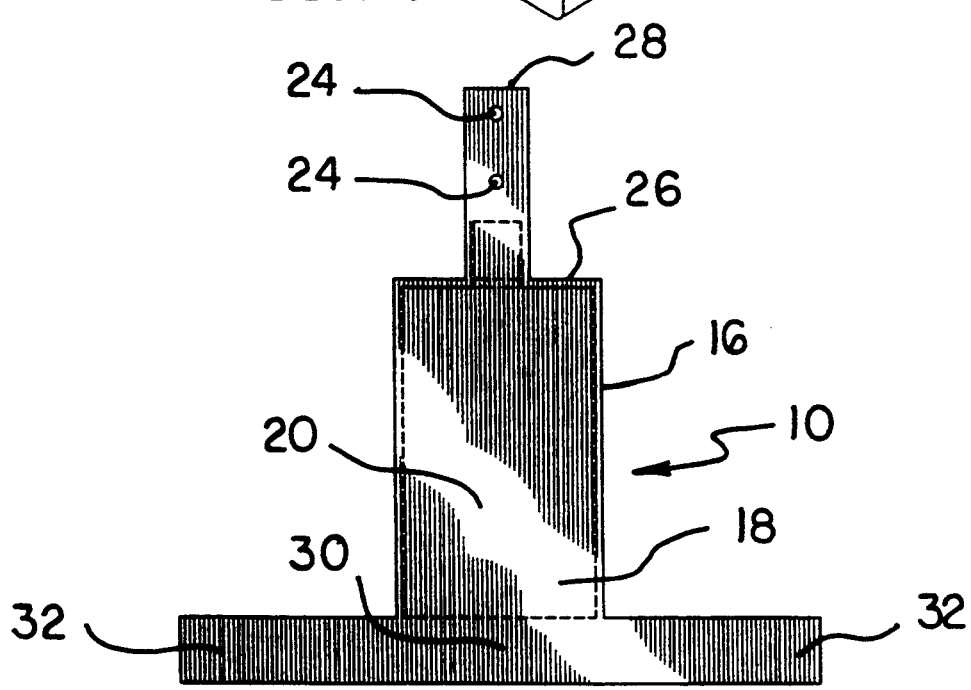
FIG. 2 is a front elevational view of the shield device

More specifically, it will be noted that FIG. 2 shows the shield device 10 having a cover 16 that has a pocket 18 for receiving a metal shield layer 20. The metal layer 20 shields the user from microwaves emitted and received by the antenna when the phone is in use. The shield device 10 is made with predetermined length, width, and thickness. Preferably, the rectangular shaped central body portion of the shield device measures $3\frac{1}{4}''$ wide by $5\frac{1}{4}''$ long. The metal shield layer 20 is made of a metal, such as aluminum. Further, the cover 16 is made of an insulating material, such as latex or rubber to minimize microwave reflection.

The shield device also comprises a top end 26 having an upper tab 28 integral therewith and a bottom end 30 having a pair of opposing lower tabs 32 extending laterally therefrom. The upper tab 28 is adapted to secure the shield device to the antenna 12. The upper tab 28 is a bendable rectangular member having a pair of apertures 24 therethrough for receiving a thin wire type antenna 12. The upper tab secures the upper end of the shield device to the upper portion of the antenna. Preferably, the upper tab measures $\frac{3}{4}''$ wide by 3" long. For mounting the shield device to the upper portion of a cellular phone, a hook and loop fastener is provided. A self-sticking material is further included therewith. The self-sticking material is wrapped around and secured thereto about the upper portion of the cellular phone.

The pair of opposing lower tabs 32 are adapted to secure the shield device 10 to the upper portion of the cellular phone 14. The lower tabs are bendable, having a hook and loop fasteners for operably coupling the shield device in place. Preferably, each of the rectangular shaped lower tab members measures 10" wide by 1" long.

Figure 3:
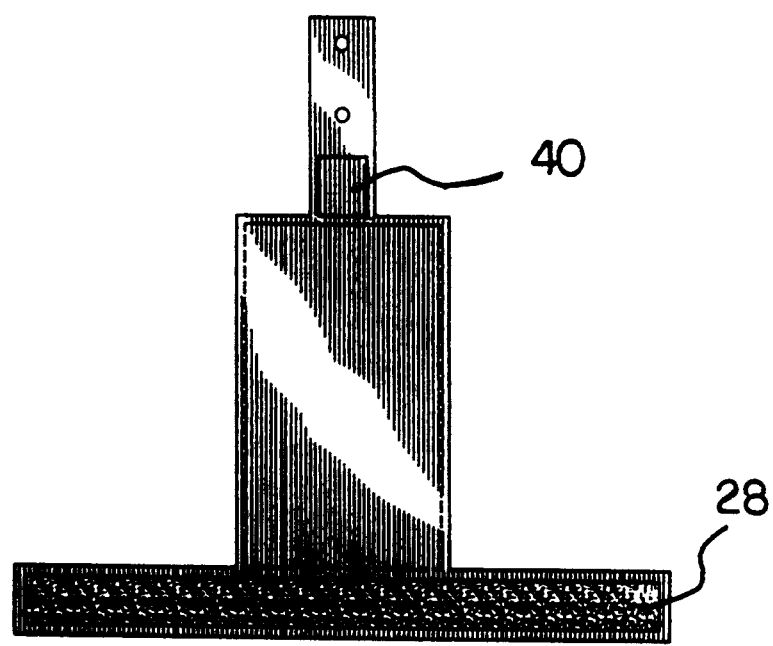
FIG. 3 is a rear elevational view of the shield device, particularly showing the hook and loop fasteners on the lower tabs.

FIG. 3 is a rear plan view of the shield device 10, particularly showing the hook and loop fasteners on the lower tabs used to firmly attach the shield device 10 to the upper portion of the cellular phone 14. Also shown is a spacer portion member 40 for keeping the antenna from direct contact with the cellular phone 14. Preferably, the spacer 40 is made of fiberglass and measures ⅜" wide by 1" long. The spacer member is positioned at the top end of the shield device intermediate the cover means and cellular phone antenna.

Figure 4:
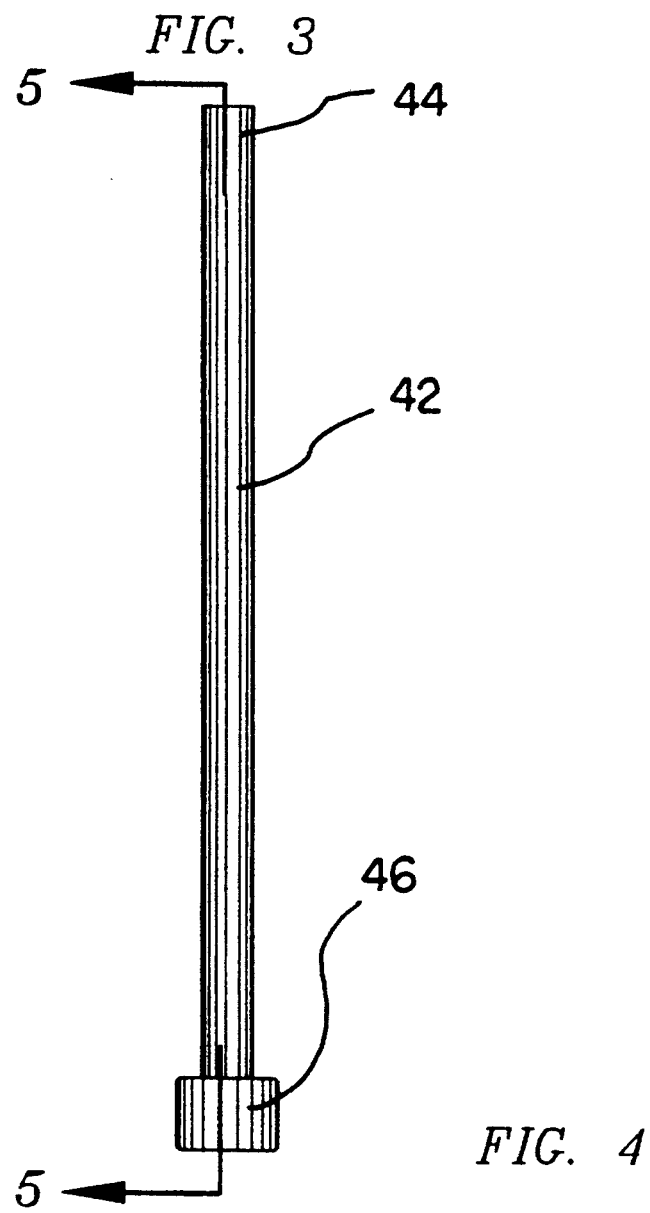
FIG. 4 is a perspective view of an alternate embodiment of the shield device designed to place over a cellular phone antenna.

FIG. 4 is an elevational view of an alternate embodiment of the invention showing a circular hollow tubular member 42. This tubular member is adapted to fit over the cellular phone antenna 12. The top of the tubular member has an open first end 44 and the bottom of the tubular member has an open second end 46.

Figure 5:
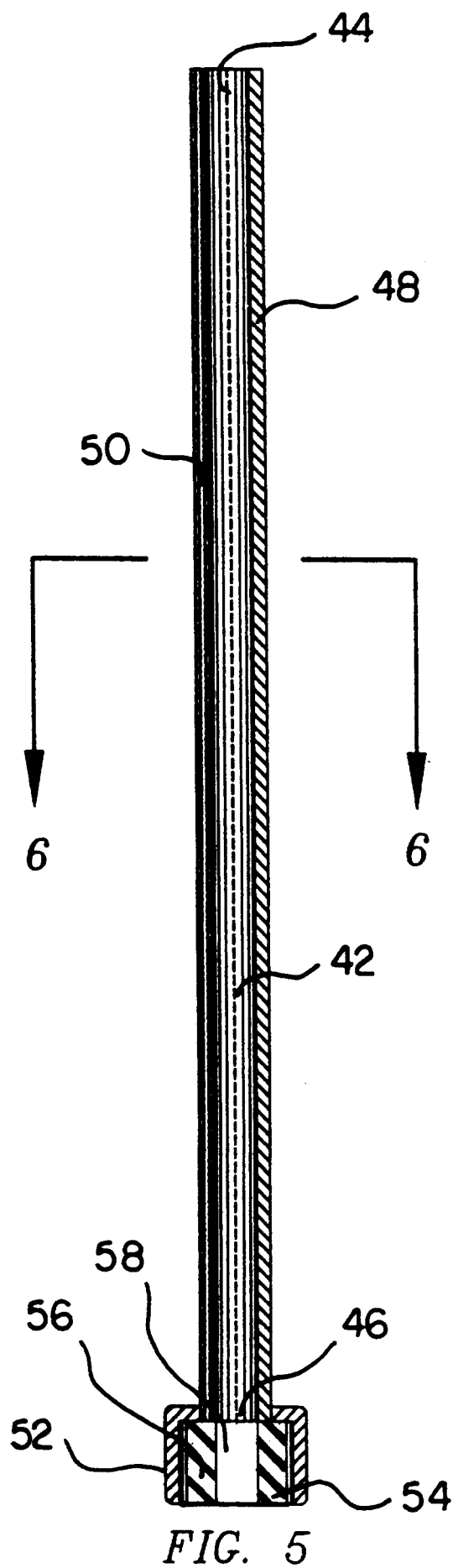
FIG. 5 is a cross-sectional view of the device as shown in FIG. 4.

Further, FIG. 5 is a cross-sectional view of the invention shown in FIG. 4 and it can be seen that the invention also and comprises a cover 48 and an inner semi-circular metal shield layer 50. The open second end 46 comprises a base portion 52 for receiving a ferrule portion of the cellular phone antenna 12. The base portion 52 has a recess 54 including a resilient disk member 56, the disk member having an aperture 58 therethrough providing a frictional fit for securing the shield device to the ferrule portion of the antenna 12.

Figure 6:
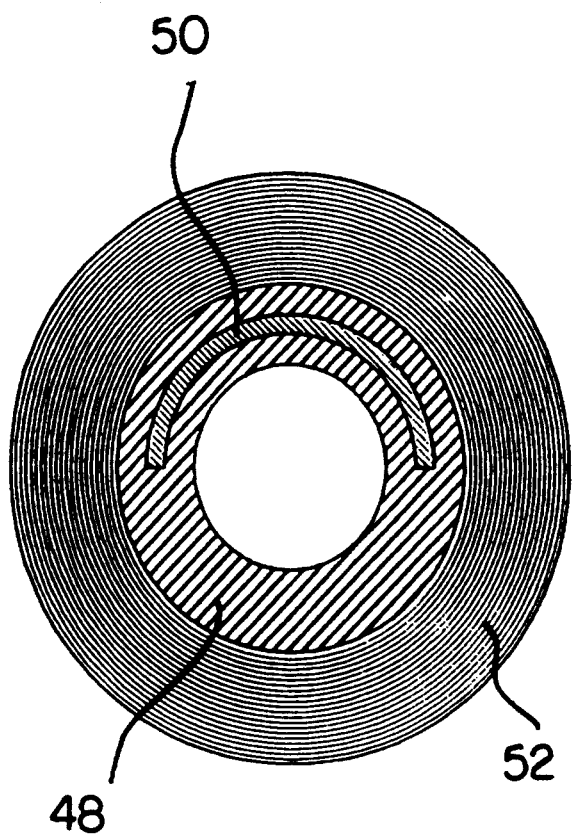
FIG. 6 is a cross-sectional view taken along line 6—6 of FIG. 5.

FIG. 6 is an enlarged cross-sectional view of the invention as shown in FIG. 4 showing the outer cover 48 and inner semi-circular metal shield layer 50.

Figure 7:
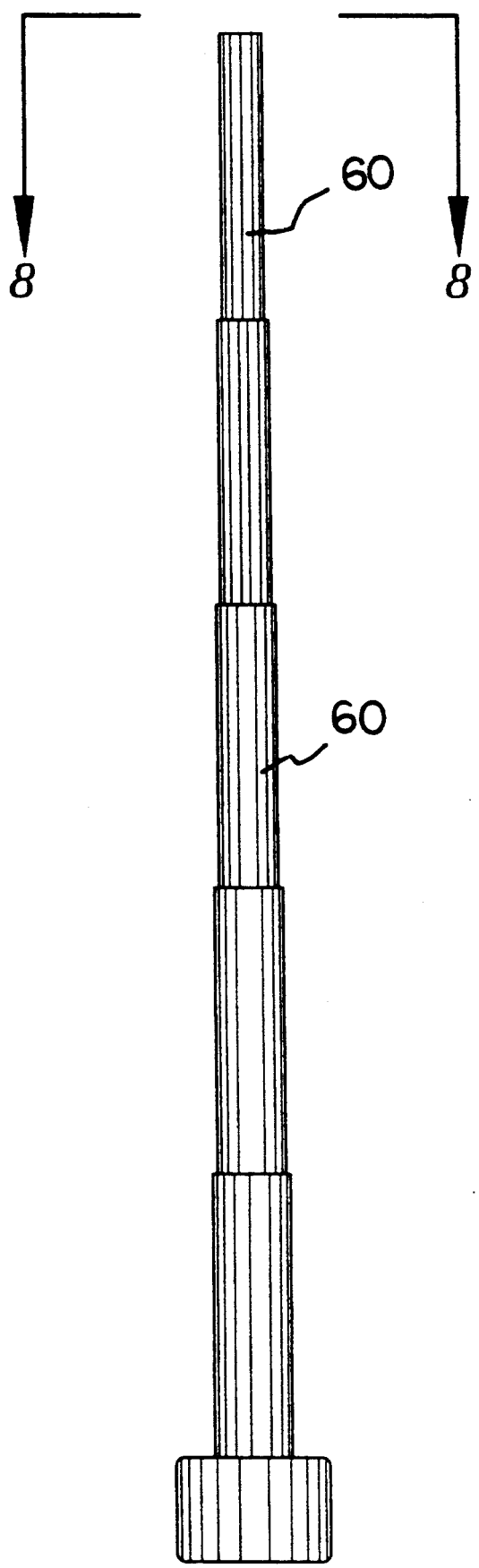
FIG. 7 is an elevational view of a further alternate embodiment of the device showing the telescoping members.

FIG. 7 is a elevational view of a further alternate embodiment of the inventions shown in FIG. 4, wherein the outer cover and inner semi-circular shield layer are formed of telescoping members 60 adapted for allowing extension and retraction of the shield device.

Figure 8:
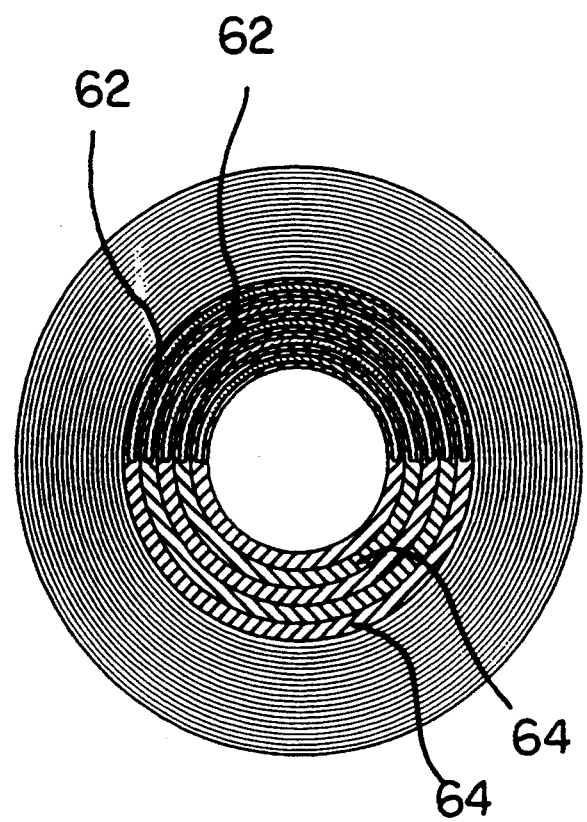
FIG. 8 is an enlarged cross-sectional view of the outer cover and the inner metal shield layer in each telescoping member of the device as shown in FIG. 7.

FIG. 8 is an enlarged cross-sectional plan view of the invention as shown in FIG. 7 showing the telescoping members comprising a telescoping inner metal shield layer 62 positioned within a telescoping outer cover 64.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention. In as much as the present disclosure includes that contained in the appended claims as well as that of the foregoing description. Although this invention has been described in its preferred forms with a certain degree of particularity, it is understood that the present disclosure of the preferred form has been made only by way of example and numerous changes in the details of construction and combination and arrangement of parts may be resorted to without departing from the spirit and scope of the invention.

What is claimed as being new and desired to be protected by Letters Patent of the United States is as follows:

1. A shield device for cellular phones whereby the shield device protects a user form microwaves emitted and received by an antenna, said shield device comprising:

a shielding means for blocking the passage of microwaves; and;

a cover means for positioning the shield means adjacent the cellular phone antenna, the cover means having pocket means for receiving the shielding means;

wherein the cover means comprises a cover with a top end having an upper tab integral therewith and a bottom end having a pair of integral, opposing lower tabs adapted as a means for securing the cover means to said cellular phone, the upper tab having a pair of apertures therethrough for receiving the cellular phone antenna, thereby securing the top end of the cover means to the cellular phone, the lower tabs having hook and loop fasteners cooperably secured thereto for securing the bottom end of the cover means to the cellular phone.

2. The shield device of claim 1 and further including a spacer member positioned at the top end of the shield device intermediate the cover means and cellular phone antenna for precluding contact between the user's head and shield device.

3. The shield device according to claim 2, wherein the shield means comprises a circular hollow tubular member cooperable with the cellular phone antenna.

4. The shield device according to claim 3, wherein the cover means is a hollow tubular member positioned about a semi-circular metal shield layer, adapted to fit over the cellular phone antenna, the cover means having an open first end and an open second end.

5. The shield device according to claim 4, wherein the cover means has an open second end comprising a base portion for receiving a base ferrule portion of the cellular phone antenna, the base potion having a recess including a resilient disk member therein for securing the shield device and cellular phone.

6. The shield device according to claim 5, wherein the inner metal shield layer and cover means are formed of telescoping members adapted for allowing extension and retraction of the shield device.

* * * * *